(12) United States Patent
Sun et al.

(10) Patent No.: US 7,621,988 B1
(45) Date of Patent: Nov. 24, 2009

(54) BAFFLES TO PREVENT CATALYST OR ADSORBENT EROSION

(75) Inventors: Bing Sun, South Barrington, IL (US); Paul A. Sechrist, South Barrington, IL (US); Michael J. Vetter, Schaumburg, IL (US); William J. Koves, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 590 days.

(21) Appl. No.: 11/458,403

(22) Filed: Jul. 19, 2006

(51) Int. Cl.
*B01D 53/02* (2006.01)

(52) U.S. Cl. .......................... 96/152; 55/518; 422/218; 422/239

(58) Field of Classification Search .................. 96/152; 55/512, 516, 518; 422/129, 168, 177, 218, 422/239
See application file for complete search history.

(56) References Cited

U.S. PATENT DOCUMENTS

| 3,818,667 A | 6/1974 | Wagner | 52/473 |
|---|---|---|---|
| 4,349,362 A * | 9/1982 | Tanaka et al. | 96/150 |
| 5,472,928 A | 12/1995 | Scheuerman et al. | 502/305 |
| 2002/0065442 A1* | 5/2002 | Williams et al. | 585/440 |

FOREIGN PATENT DOCUMENTS

JP    53146261 A2    12/1978

* cited by examiner

*Primary Examiner*—Robert A Hopkins
(74) *Attorney, Agent, or Firm*—Mark Goldberg

(57) ABSTRACT

An apparatus is shown for contacting a bed of particulate material with a cross flowing fluid, which maintains the bed of particulate material within a retention volume. The apparatus includes partitions for retaining particles, with apertures disposed within the partitions. The apertures are covered by louvers that extend above the edges of the apertures to prevent solid particles from spilling through inlet apertures. And the apparatus includes baffles to inhibit erosion of the particles by redirecting the inlet gas flow.

6 Claims, 4 Drawing Sheets

BAFFLES TO PREVENT CATALYST OR ADSORBENT EROSION

FIELD OF THE INVENTION

The present invention relates to improved reactor design, and more particularly to improved reactor design with moving beds of particulate materials.

BACKGROUND OF THE INVENTION

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

The screens or meshes used to hold the catalyst particles within a bed are sized to have apertures sufficiently small that the particles cannot pass through. A significant problem is the corrosion of meshes or screens used to hold catalyst beds in place, or for the distribution of reactants through a reactor bed. Corrosion can plug apertures to a screen or mesh, creating dead volumes where fluid does not flow. Corrosion can also create larger apertures where the catalyst particles can then flow out of the catalyst bed with the fluid and be lost to the process increasing costs. This produces unacceptable losses of catalyst, and increases costs because of the need to add additional makeup catalyst.

The design of reactors to overcome these limitations can save significantly on downtime for repairs and on the loss of catalyst, which is a significant portion of the cost of processing hydrocarbons.

SUMMARY OF THE INVENTION

The invention comprises a cross-flow reactor or a cross-flow adsorber, where the apparatus has an inlet partition and an outlet partition. The partitions define a particle retention volume where a catalyst or adsorbent is held as a catalyst bed or an adsorbent bed. The catalyst or adsorbent can flow through the apparatus between the inlet and outlet partitions. The partitions have apertures defined therein for allowing the flow of gas or fluid across the solid particulate bed. The inlet partition further includes louvers over the apertures to provide for a screenless inlet partition, which allows for freer flow of the gas. The louvers include a baffle affixed to the underside of the louver for changing the direction of the flow of the gas. The baffle breaks up flow along the louver and redirects and spreads out the flow to prevent high speed impingement of the gas with the catalyst, which erodes the catalyst.

Other objects, advantages and applications of the present invention will become apparent to those skilled in the art from the following drawings and detailed description.

DETAILED DESCRIPTION OF THE INVENTION

Radial flow reactors are designed for the downward flow of catalyst through a catalyst retention area, with a cross flow of gas through the catalyst bed. The typical reactor design entails a screened inlet partition where the gas passes through a screen to the catalyst bed, and the screen has holes of a small enough size to prevent catalyst particles from passing through. Recent developments have created a screenless inlet partition to address some of the problems associated with the screened inlet partition having louvers to prevent the passage of catalyst through the inlet partition, but still admitting the gas.

With screenless partitions, a problem was encountered in that there was unacceptable losses of catalyst, and that the losses were in the form of fines. The catalyst was being eroded and creating fines that were being removed from the reactor with the reacted gas. The formation of catalyst fines and loss of catalyst is a significant expense to the operation of an olefin reactor. It was necessary to determine where the catalyst was being eroded.

It was discovered that the problem was with the inlet flow of gas, in that the flow was jetting along the underside of the louvers. The jetting flow needs to be broken up as it passes under the louvers. A solution was to place a baffle on the louvers to prevent the gas flow from creating a jet that was causing the erosion of catalyst and subsequent production of fines.

The present invention comprises an apparatus for supporting a granular solid in a cross-flow system. The apparatus includes an inlet partition having apertures defined therein and an outlet partition having aperture defined therein, where the space between the inlet and outlet partitions defines a particle retention volume. The apparatus further includes at least one inlet louver, where each louver has an upper edge and a lower edge, and the louver upper edge is affixed to the inlet partition at a position above an inlet aperture, and the louver lower edge extends into the particle retention volume at an angle between about 1 degree and about 85 degrees. The louver further includes at least one baffle disposed on the underside of the louver, and where the baffle projects substantially perpendicular to the louver. The louvers are preferably disposed at an angle that will overcome hydraulic hold up of the catalyst flowing over the louvers.

Figure 1:
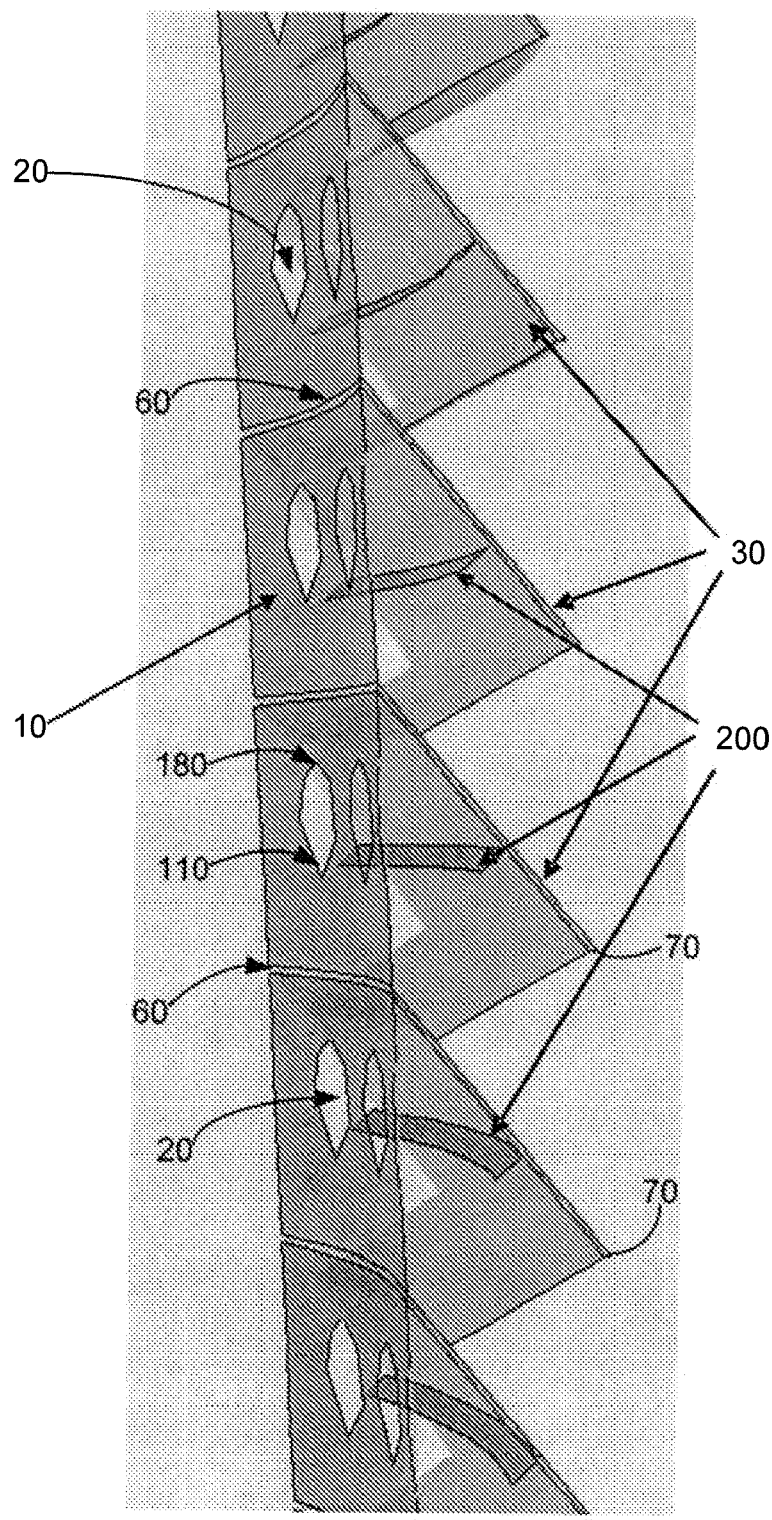
FIG. 1 is an embodiment of the invention with baffles on the louvers.

Preferably, the louvers are at an angle between about 10 degrees and about 50 degrees, and the baffles are disposed on the louvers at a position between about 10% and about 90% of the length from the louver upper edge to the louver lower edge. An embodiment of the present invention is shown in FIG. 1, wherein the inlet partition 10 comprises a plurality of apertures 20 defined therein, where each aperture 20 has an upper edge 180 and a lower edge 110. The inlet partition 10 has a gas side, where gas entering the reactor flows, and a catalyst side, where catalyst moves down the reactor as the gas flows across the catalyst in the reactor. The inlet partition 10 further includes at least one louver 30 affixed to the partition 10 on the catalyst side. The louver 30 has an upper edge 60 and a lower edge 70, and the upper edge 60 is affixed above an aperture 20, and the lower edge 70 extends downward to at least the height of the aperture lower edge 110, and preferably below the aperture lower edge 110.

The baffles 200 are positioned on the underside of the louvers 30, and preferably are positioned below the aperture lower edge 110. The baffles 200 are for breaking up the jetting inlet flow of the gas and preferably are positioned between about 30 percent and 70 percent of the length of the louvers from the upper edge to the lower edge, and more preferably between about 50 percent and 70 percent of the length of the louvers from the upper edge to the lower edge. The baffles 200 project substantially perpendicularly from the louvers 30. The baffles 200 extend between about 10% and about 50% of the distance between the louver 30 and the inlet partition 10, where the distance is determined at the position of the baffle 200 and projecting perpendicularly from the baffle 200 to the inlet partition 10. Preferably, the baffles 200 extend between about 15% and about 30% of the distance from the louver 30 to the inlet partition 10.

In another embodiment, the apparatus comprises a first baffle 200 and a second baffle (not shown). The first baffle 200 is the baffle affixed to the louver 30, and the second baffle is a baffle affixed to the inlet partition 10 at a position between the louver 30 and the inlet partition 10, and disposed below the aperture 20 on the inlet partition 10. The second baffle provides a barrier to the catalyst during the loading phase of the reactor. During loading, catalyst can rise into the space underneath the louvers, and particularly along the inlet partition. The second baffle prevents catalyst from rising to the apertures in the inlet position. A secondary benefit is that the second baffle can aid in the break up of the flow, and also aids in containment of the catalyst or adsorbent. The second baffle provides a barrier for catalyst lifted along the inlet partition wall due to circulation of the inlet gases.

In another embodiment, the apparatus comprises louvers affixed to the outlet partition. The outlet partition has apertures defined therein, and has a catalyst side and an outlet gas side. The catalyst side is the side of the outlet partition where the particle retention volume is defined. The louvers affixed to the outlet partition extend downward from the outlet partition into the particle retention volume at an angle between about 1 degree and about 85 degrees, and preferably at an angle between about 10 degrees and about 50 degrees. Each outlet louver has an upper edge and a lower edge, where the upper edge is affixed to the outlet partition at a position above an aperture in the outlet partition. The lower edge extends to at least the lower edge of the outlet partition aperture covered by the louver.

In this embodiment, the apparatus further comprises at least one outlet baffle affixed to an outlet louver on the underside of the outlet louver, and the baffle projects substantially perpendicularly from the louver. The apparatus can also incorporate a baffle affixed to the outlet partition, disposed below the outlet aperture and between the outlet partition and the outlet louver. Baffles in these positions provide the additional benefit of reducing or preventing the carrying out of catalyst with the outflowing gas.

Figure 2:
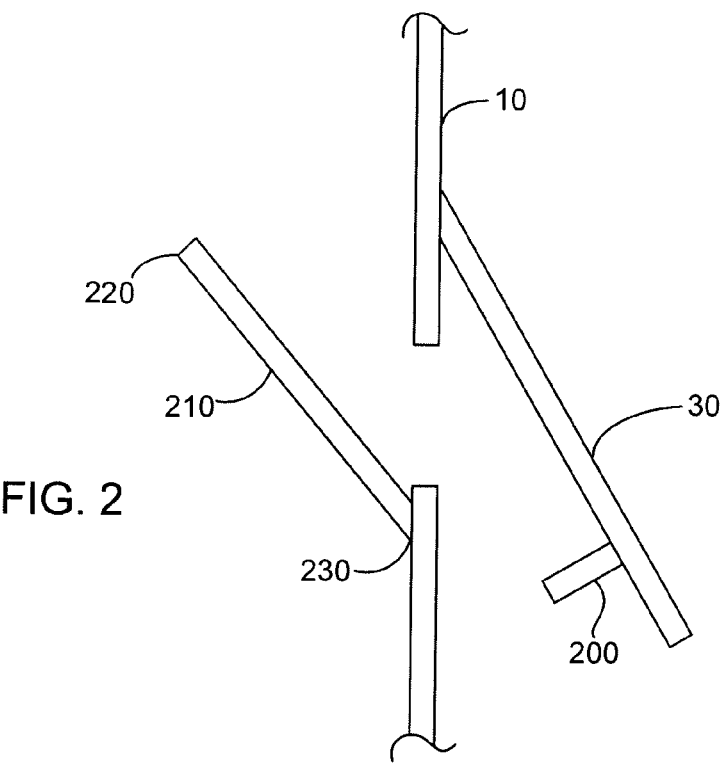
FIG. 2 is an embodiment showing the addition of inlet vanes.

In another embodiment, the apparatus further comprises a plurality of inlet vanes. The inlet vanes are disposed on the inlet partition. As shown in FIG. 2, the inlet vanes 210 are disposed on gas side of the inlet partition 10. The inlet vanes 210 provide secondary backup for catalyst, or adsorbent, containment, preventing any catalyst from spilling out of the reactor. The inlet vanes 210 can be made in a variety of shapes, such as an inverted conical shaped structure, or inverted pyramidal structure, or an L-shaped structure affixed to the inlet partition 10. The inlet vanes 210 have an upper edge 220 and a lower edge 230, and preferably the lower edge 230 of each inlet vane 210 is affixed to the inlet partition 10 at, or near, the lower edge of the aperture. It is also preferred that the inlet vanes 210 extend upward and away from the inlet partition 10 at an angle between about 20 degrees and about 50 degrees. The choice of design for the inlet vanes is determined by a variety of factors, including, but not limited to, flow considerations, and available space in the inlet flow channel of the reactor.

Figure 3:
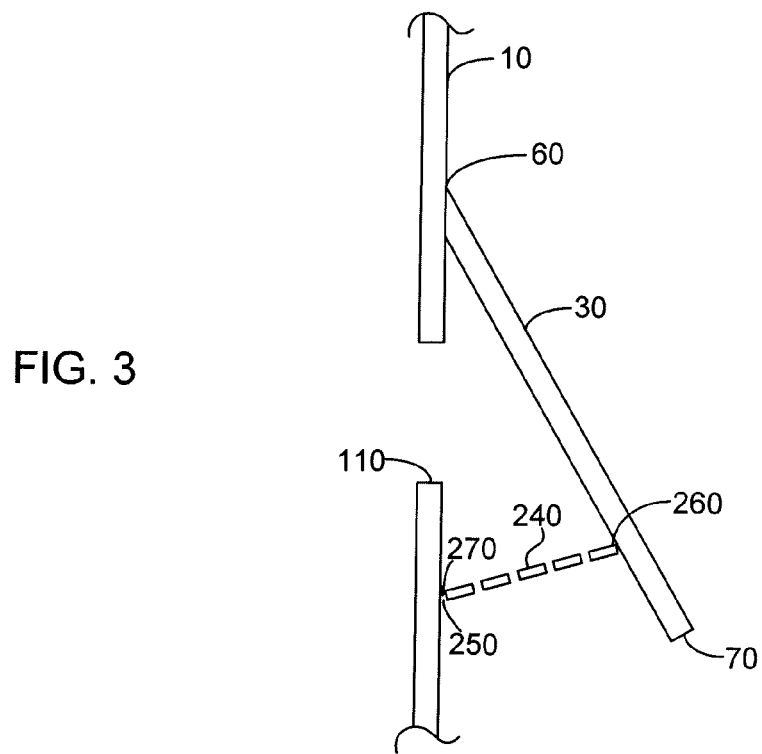
FIG. 3 is an embodiment with a particle retention screen as a part of the baffle.

Another embodiment of the invention combines aspects of design that contributes to preventing the erosion of catalyst at the louver where the surface of the catalyst bed meets the louver, and catalyst retainment. In this embodiment, as shown in FIG. 3, a perforated particle containment baffle 240 is affixed to the underside of the louver 30, and extends across the space between the louver 30 and the inlet partition 10. The baffle 240 is also disposed above the surface of the catalyst bed so as not to be in continuous contact with the catalyst. The perforated particle containment baffle 240 has a relatively large percentage of the baffle open for unrestricted gas flow. The perforated particle containment baffle 240 also is spaced from the inlet partition 10 to allow for particles that manage to get by the baffle 240 to slide down and through the gap 250 between the baffle 240 and the inlet partition 10. The perforated particle containment baffle 240 has a louver side edge 260 and an inlet partition side edge 270. The louver side edge 260 is affixed to the louver 30 at a position between about 30% to about 70% of the length of the louver from the louver upper edge 60 to the louver lower edge 70. The inlet partition side edge 270 is disposed a distance from the inlet partition 10 greater than the characteristic size of the catalyst particles, and at a position below the aperture lower edge 110. The inlet partition side edge 270 can be held in place by spacers, or other means known to those skilled in the art. A feature of the perforated particle containment baffle 240 is that the baffle 240 also breaks up the flow of the gas and redistributes the gas flow more evenly as the gas flows to the catalyst bed.

In another embodiment, the apparatus has an inlet partition with a plurality of apertures defined therein, and an outlet partition with a plurality of apertures defined therein, and the space between the partitions is defined at the particle retention volume. The inlet partition 10 has a plurality of louvers 30 affixed to the inlet partition 10 where each louver 30 has an upper edge 60 and a lower edge 70. The lower edge 70 of the louvers 30 are affixed to the inlet partition 10 at the lower edge 110 of the apertures in the inlet partition 10. The louvers 30 extend away from the particle retention volume side of the inlet partition 10 at an angle between about 5 degrees and about 85 degrees, with the louver 30 extending a distance, d, above the aperture upper edge by a distance according to the formula:

$$d = L \cdot \sin(\theta) \cdot \tan(\phi),$$

where L is the length of the louver 30 from the lower edge to the upper edge, θ is the angle the louver extends away from the inlet partition, and φ is the angle of repose for the granular solid that is disposed within the particle retention volume. The apparatus further includes a baffle affixed to each louver on the upper side of the louver, and projects substantially perpendicularly from the louver. The baffle breaks the jetting gas flow along the upper side of the louver to reduce erosion of the catalyst.

EXAMPLE

Figure 4:
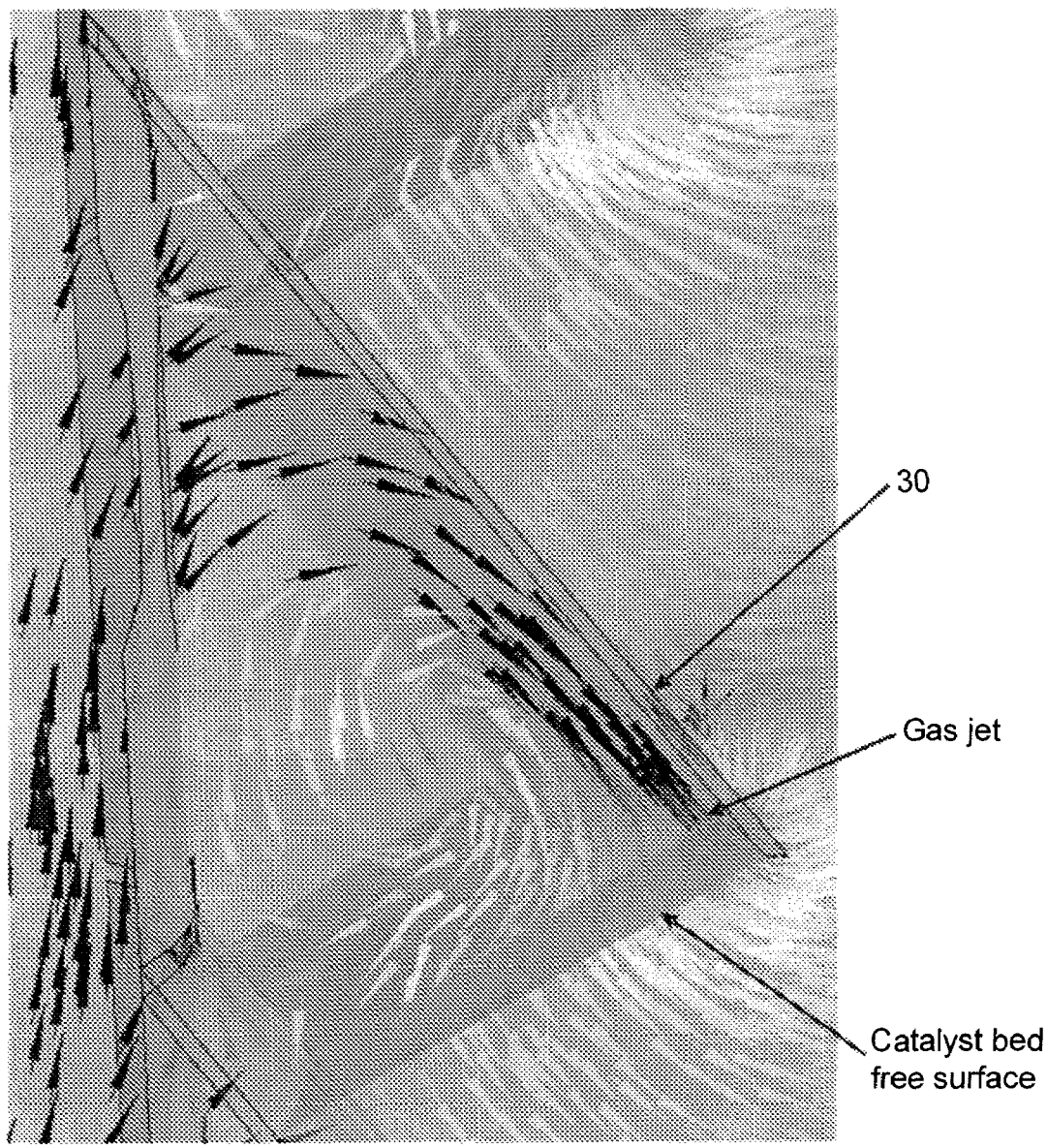
FIG. 4 is a simulation of the gas flow pattern without the baffles.

In studying the problem of erosion of catalyst, it was found that the inlet flows are a cause of fines from the catalyst. A numerical simulation was carried out with gas flowing into the reactor, and the region under the louver was studied. As shown in FIG. 4, the inlet flows are very rapid along the under surface of the louver 30 and impact the catalyst where the catalyst bed surface meets the louver 30. The rapid flow of gas at a localized position is having a deleterious effect on the integrity of the catalyst. Therefore, changing the gas flow near the region where the catalyst bed surface meets the louvers can improve the life of the catalyst by reducing catalyst erosion.

Figure 5:
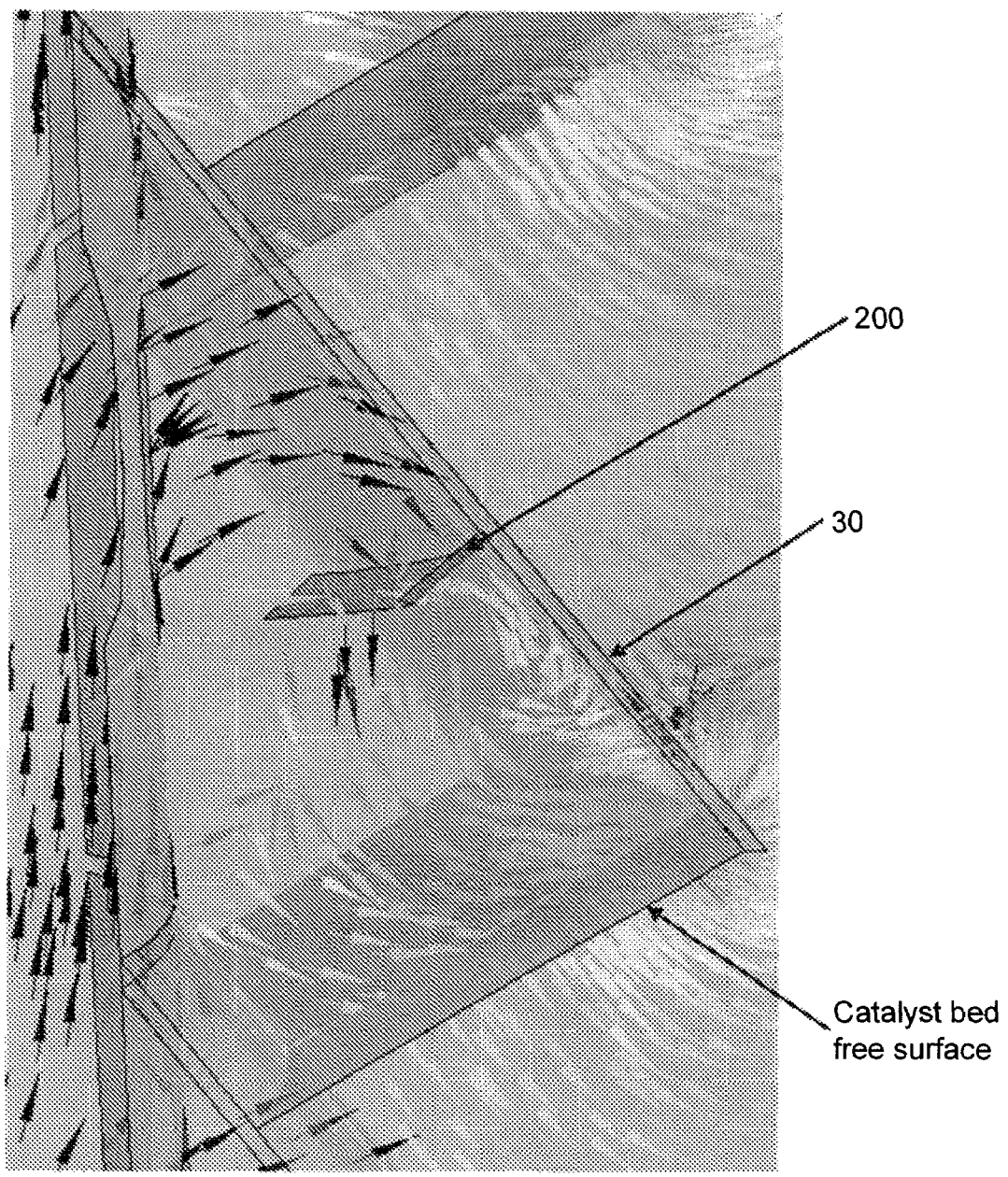
FIG. 5 is a simulation of the gas flow pattern with the baffles of the present invention.

From the results of the gas flow as shown in FIG. 4, the gas flow along the louver needs to be diverted, or reduced in magnitude. A baffle 200 was added to break up the flow along the louver 30, and to reduce the flow of gas at the junction where the catalyst bed surface meets the louver 30. The numerical results for one case are shown in FIG. 5, where the gas flow is diverted away from the louver 30 with a reduction in the speed of the gas at the junction where the catalyst bed surface meets the louver.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An apparatus for supporting a granular solid in a cross-flow system comprising:
    an inlet partition having apertures defined therein, where each aperture has a lower edge and an upper edge;
    an outlet partition having apertures defined therein, where each aperture has a lower edge and an upper edge, and wherein the inlet partition and the outlet partition are spaced to define a particle retention volume for holding a granular solid;
    at least one inlet louver, where each louver has an upper edge and a lower edge, and the louver upper edge is affixed to the inlet partition at a position above an inlet aperture, the louver lower edge extends into the particle retention volume at an angle between about 1 degree and about 85 degrees, and the louver lower edge extends to at least the aperture lower edge; and
    at least one baffle affixed to each louver on the under side of the louver, and where the baffle projects substantially perpendicular from the louver, wherein the baffle affixed to the louver is a first baffle, and further comprising a second baffle affixed to the inlet partition disposed in a position between the louver and the inlet partition and below the lower edge of the inlet aperture.

2. An apparatus for supporting a granular solid in a cross-flow system comprising:
    an inlet partition having apertures defined therein, where each aperture has a lower edge and an upper edge;
    an outlet partition having apertures defined therein, where each aperture has a lower edge and an upper edge, and wherein the inlet partition and the outlet partition are spaced to define a particle retention volume for holding a granular solid;
    at least one inlet louver, where each louver has an upper edge and a lower edge, and the louver upper edge is affixed to the inlet partition at a position above an inlet aperture, the louver lower edge extends into the particle retention volume at an angle between about 1 degree and about 85 degrees, and the louver lower edge extends to at least the aperture lower edge;
    at least one baffle affixed to each louver on the under side of the louver, and where the baffle projects substantially perpendicular from the louver;
    outlet louvers, where each outlet louver has an upper edge and a lower edge, and the outlet louver upper edge is affixed to the outlet partition at a position above an outlet aperture and the louver extends into the particle retention volume at an angle between about 1 degree and about 85 degrees and the louver lower edge extends below the aperture lower edge;
    at least one outlet baffle affixed to each outlet louver on the under side of the louver, and where the baffle projects substantially perpendicular from the louver; and
    at least one second outlet baffle affixed to the outlet partition below the outlet aperture and between the outlet partition and the outlet louver.

3. An apparatus for supporting a granular solid in a cross-flow system comprising:
    an inlet partition having apertures defined therein, where each aperture has a lower edge and an upper edge;
    an outlet partition having apertures defined therein, where each aperture has a lower edge and an upper edge, and wherein the inlet partition and the outlet partition are spaced to define a particle retention volume for holding a granular solid;
    at least one inlet louver, where each louver has an upper edge and a lower edge, and the louver upper edge is affixed to the inlet partition at a position above an inlet aperture, the louver lower edge extends into the particle retention volume at an angle between about 1 degree and about 85 degrees, and the louver lower edge extends to at least the aperture lower edge;
    at least one baffle affixed to each louver on the under side of the louver, and where the baffle projects substantially perpendicular from the louver; and
    a plurality of inlet vanes where each inlet vane has an upper edge and a lower edge, and each inlet vane lower edge is affixed to an inlet partition aperture lower edge, and each inlet vane extends upward outside of the particle retention volume at an angle between about 20 degrees and about 50 degrees from vertical.

4. An apparatus for supporting a granular solid in a cross-flow system comprising:
    an inlet partition having apertures defined therein, where each aperture has a lower edge and an upper edge;
    an outlet partition having apertures defined therein, where each aperture has a lower edge and an upper edge, and wherein the inlet partition and the outlet partition are spaced to define a particle retention volume for holding a granular solid;
    at least one inlet louver, where each louver has an upper edge and a lower edge, and the louver upper edge is affixed to the inlet partition at a position above an inlet aperture, the louver lower edge extends into the particle retention volume at an angle between about 1 degree and about 85 degrees, and the louver lower edge extends to at least the aperture lower edge;

at least one baffle affixed to each louver on the under side of the louver, and where the baffle projects substantially perpendicular from the louver; and a perforated particle containment baffle wherein the particle containment baffle is disposed between the inlet partition and the louver and where the particle containment baffle has a first edge disposed below the inlet aperture and a second edge disposed on the underside of the louver at a position between about 30 percent to about 70 percent of the length from the louver upper edge to the louver lower edge.

5. The apparatus of claim 4 wherein first edge of the particle containment baffle is spaced a distance from the inlet partition greater than the size of a particle held in the particle retention volume.

6. An apparatus for supporting a granular solid in a cross-flow system comprising:

an inlet partition having apertures defined therein, where each aperture has a lower edge and an upper edge;

an outlet partition having apertures defined therein, where each aperture has a lower edge and an upper edge, and wherein the inlet partition and the outlet partition are spaced to define a particle retention volume for holding a granular solid;

at least one inlet louver, where each louver has an upper edge and a lower edge, and the louver lower edge is attached to the inlet partition at the lower edge of the inlet aperture and extends away from the particle retention volume space at an angle between about 5 degrees and about 85 degrees and the louver upper edge extends at least a distance, d, above the aperture upper edge according to the formula:

$$d = L*\sin(\theta)*\tan(\varphi),$$

where L is the length of the louver, $\theta$ is the angle the louver extends away from the inlet partition, and $\varphi$ is the angle of repose for the granular solid;

at least one baffle affixed to each louver on the upper side of the louver, and where the baffle projects substantially perpendicularly from the louver; and a perforated particle containment baffle wherein the particle containment baffle is disposed between the inlet partition and the louver and where the particle containment baffle has a first edge disposed above the inlet aperture and a second edge disposed on the upperside of the louver at a position between about 30 percent to about 70 percent of the length from the louver upper edge to the louver lower edge.

\* \* \* \* \*

UNITED STATES PATENT AND TRADEMARK OFFICE
CERTIFICATE OF CORRECTION

PATENT NO.       : 7,621,988 B1                                        Page 1 of 1
APPLICATION NO.  : 11/458403
DATED            : November 24, 2009
INVENTOR(S)      : Sun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 718 days.

Signed and Sealed this

Twenty-sixth Day of October, 2010

David J. Kappos
*Director of the United States Patent and Trademark Office*